United States Patent [19]
Guzik et al.

[11] Patent Number: 4,680,516
[45] Date of Patent: Jul. 14, 1987

[54] MOTOR SPEED CONTROL SYSTEM

[75] Inventors: Nahum Guzik, Mountain View; Gennady Mangeym, Sunnyvale; James W. Jones, Woodside, all of Calif.

[73] Assignee: Guzik Technical Enterprises, Sunnyvale, Calif.

[21] Appl. No.: 868,735

[22] Filed: May 30, 1986

[51] Int. Cl.⁴ ............................................. G05B 19/28
[52] U.S. Cl. ..................................... 318/326; 318/327; 318/314; 318/341; 318/317; 318/318; 318/138
[58] Field of Search ............... 318/138, 254, 257, 258, 318/259, 262, 266, 267, 269, 278, 280, 283, 286, 287, 288, 289, 293, 294, 298, 299, 300, 314, 317, 318, 322, 326, 327, 328, 332, 331, 341, 339, 338, 340, 345 R, 345 B, 345 E, 345 F, 359, 439, 599–608, 618, 628

[56] References Cited
U.S. PATENT DOCUMENTS

| | | | |
|---|---|---|---|
| 3,564,368 | 1/1968 | Kelling | 318/314 |
| 3,950,682 | 4/1976 | Dohanich | 318/314 |
| 4,153,863 | 5/1979 | Schachte et al. | 318/138 X |
| 4,376,262 | 3/1983 | Okuda et al. | 318/138 X |
| 4,463,300 | 7/1984 | Mayne et al. | 318/603 X |
| 4,486,692 | 12/1984 | Sonoda et al. | 318/327 X |
| 4,516,060 | 5/1985 | Guzik et al. | 318/341 |
| 4,631,462 | 12/1986 | Geven | 318/327 X |

Primary Examiner—William M. Shoop, Jr.
Assistant Examiner—Shik Luen Paul Ip
Attorney, Agent, or Firm—David Pressman

[57] ABSTRACT

A motor speed control system comprises an encoder (12) which produces a series of indicator pulses related to the motor's speed. The period of the pulse is compared with that of a crystal-controlled reference period produced by a period generator (14). Comparison is made by means of a period comparator (16) consisting of logic elements, including flip-flops (F1, F2, F3) and gates (G1 and G2). Digital outputs of the period comparator control UP and DOWN charge pumps whose integrated value controls the motor through a power driver. Advantages of the system are precise digital control with crystal accuracy.

12 Claims, 10 Drawing Figures

Motor Speed Control System

Fig 1  Motor Speed Control System

Fig 2
Motor At Reference Speed

Fig 3 Motor Speed Lower Than Reference Speed

Fig 4A
Speed Higher Than Reference But Lower Than Twice Reference Speed

Fig 4B
Speed Higher Than Twice Reference Speed

Fig 5  A specific embodiment of a Charge Pump and Integrator

Fig 6 illustrating another embodiment of the Charge Pump

Fig 7 Motor Speed Control System With One Timer

Fig 8A  Speed higher than Reference
(for system of fig 7)

Fig 8B  Speed lower than reference

MOTOR SPEED CONTROL SYSTEM

BACKGROUND—FIELD OF THE INVENTION

The present invention relates to motor speed control systems and analogs thereof, particularly to a control system for maintaining the speed of the motor constant with a high degree of accuracy.

BACKGROUND—DESCRIPTION OF PRIOR ART

Precision motor speed control circuits have a variety of applications, including phonographic turntables, audio or video tape recorders, and disk drive units.

One circuit for accurately controlling the speed of a motor is disclosed in U.S. Pat. No. 4,516,060 to N. Guzik and G. Mangeym, May 7, 1985. Although this circuit can provide accuracy within 0.1% of the desired speed, it still entails some problems. Specifically, since the integrator of the system uses capacitors which work in a charge/discharge mode, the accuracy of the speed control circuit depends essentially on the accuracy of the capacitors and the circuit's other components. In addition, the control voltages from the integrator have a sawtooth shape; this causes undesirable ripple in the motor's current.

OBJECTS OF THE INVENTION

Accordingly, an object of the present invention is to reduce dependence of system's performance on accuracy of the circuit's components. Other objects are to improve accuracy of a motor speed control system to about 0.01%, and to provide a novel sample and hold function and to eliminate motor current ripple. Further objects and advantages will become apparent from a consideration of the ensuing description and drawings.

Figure 1:
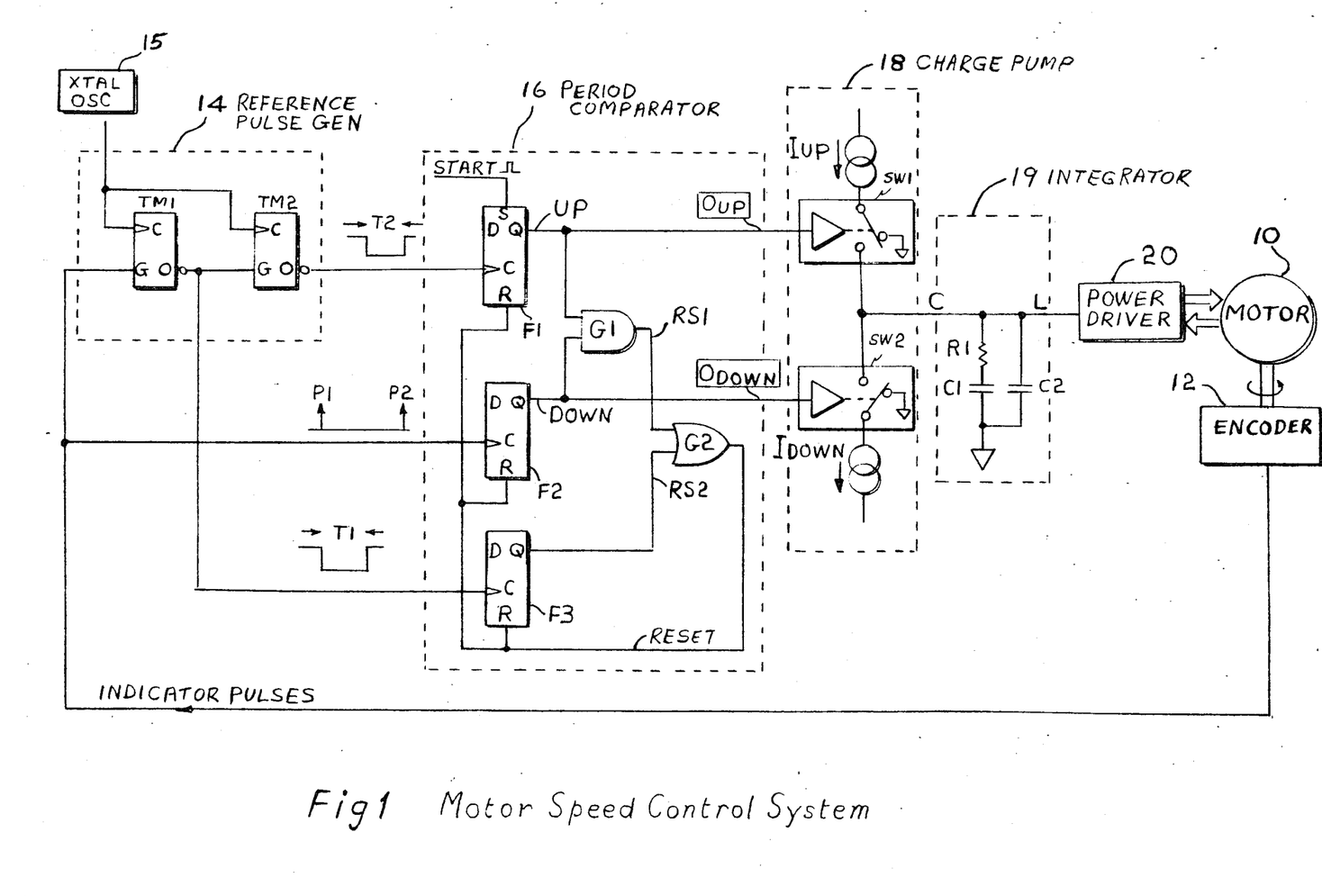
FIG. 1 is a block diagram of a motor speed control system of the invention.

FIG. 1—DESCRIPTION OF THE PREFERRED EMBODIMENT OF THE INVENTION

A motor speed control system shown in FIG. 1 consists of a d.c. motor 10, an electromechanical encoder 12 (which can be a mechanical, optoelectric, magnetic or any other pulse-generating encoder), and a reference generator circuit 14 which is formed of two counters TM1 and TM2 which in this particular embodiment operate as timers, and a period comparator 16, a charge pump 18, an integrator 19, and a power driver 20. Encoder 12 generates one or more speed indicating pulses for each revolution of the motor; thus the frequency of these indicator pulses is in proportion to the motor's rotational speed.

Timers TM1 and TM2 are known per se and comprise, e.g., 8254 type programmable interval timers produced by Intel Corp. The 8254 counter timer is commonly used in computer control systems and can be adapted to a variety of tasks by selection of one of several possible modes of operation. Inputs for data, write enable, and chip select (not shown in the drawings) are provided; these inputs for both timers (TM1 and TM2) are connected to an external computer bus or any other suitable source (not shown) so that the counter timers can be initialized. In this case, each counter timer is set to operate as a "hardware retriggerable one-shot", as described in the "Intel Microprocessor and Peripheral Handbook", 1983.

Each timer has a clock input C connected to a crystal-controlled oscillator (XTAL OSC) 15. Also each timer has a gate input G. A positive-going input at G starts the timing period T running. An internal count value, previously set during initialization, is determined by each clock pulse, until a count of zero terminates the timing period. By this means, an output pulse 0 (not shown in the drawings) is generated having a controlled pulse length T with an accuracy equal to that of XTAL OSC 15. Timers TM1 and TM2 generate timing pulses having durations T1 and T2 respectively. Each timer's output includes a circle or "bubble", indicating that each timer's output is inverted; this causes the leading edges of the timing periods to be negative going, and the trailing edges to be positive going as shown.

It was previously stated that the timers are retriggerable. This means that if new triggering occurs before termination of a timer output, then the timer output is extended. Termination of the output pulse takes place at time T following occurance of the latest triggering signal.

The trailing edges of the timers' outputs are supplied to a period comparator 16 which consists of two D-type flip-flops F1 and F2, an AND gate G1, an inclusive OR gate G2 and a third D-type flip-flop F3. The output of timer TM2 is connected to a clock input C of flip-flop F1. The clock input C of flip-flop F2 is connected to the output of encoder 12. The D inputs of flip-flops F1, F2, and F3 receive constant ONE signals.

The Q outputs of flip-flops F1 and F2, which supply UP and DOWN signals, respectively, are coupled through series-connected gates G1 and G2 to reset inputs R of flip-flops F1, F2, and F3, respectively.

For convenience of description, we will refer to the output of gate G1 as reset RS1, and the output of flip-flop F3 as reset RS2; resets RS1 and RS2 are supplied to OR gate G2. The output of timer TM1 is connected to the clock input of flip-flop F3 and the output of flip-flop F3 is connected to the other input of OR gate G2.

The system is provided with a START input line which is connected to the set input S of flip-flop F1. This line receives an initiating pulse from an external source such as a computer or the like (not shown in the drawings).

Period comparator 16 is connected to a charge pump 18 which functionally is shown to consist of two current sources I(up) and I(down) in series with logic-controlled switch units. The switch units operate so that current flow to a common point C may be enabled or disabled in response to control inputs O(up) and O(down) from period comparator 16. More specific embodiments of the charge pump will be desribed later in connection with FIGS. 5 and 6.

The common point C of the switched current sources is connected to an integrator 19 which consists of resistor R1 and capacitor C1 which are connected in series from point C to ground and which are shunted by capacitor C2. Normally C1 is the dominant component of integrator 19, and the voltage at point C is closely approximated by the inverse of the magnitude of C1 multiplied by the accumulated charge at point C, i.e., the voltage is proportional to the time integral of input current I(up)−I(down).

Components R1 and C2 modify the behavior of the integrator, more particularly at upper frequency limits of the speed control system. They are used to stabilize the speed control system by "lead-lag compensation", a procedure that is well known to control system engineers.

Charge pump 18 and integrator 19 function as a digital-to-analog converter.

The output of integrator 19 is input to a voltage-controlled power driver 20, which, in turn, closes the control loop to motor 10. An example of a suitable power driver for use with a brushless three-phase DC motor, is type TA 7259P integrated curcuit manufactured by Toshiba Corporation. The manner of use of this circuit with such a motor is described in Toshiba "Motor Control and Driver IC Series Data Book", 1984.

OPERATION OF THE SYSTEM OF FIG. 1

In the context of the present invention, "UP" means that the speed of the motor is to be increased and "DOWN" means that slow down of the motor is desired.

Initially, because the motor is at rest, there are no speed indicator pulses from encoder 12 to operate pulse comparator 16. Therefore to begin operation, a START pulse is first applied to the set input S of flip-flop F1, causing it to be placed in the UP condition. Because UP can be cancelled by DOWN, we must also examine the condition of flip-flop F2. If flip-flop F2 is initially in the DOWN state, i.e., its Q output is high, then both inputs of AND gate G1 are high. Output RS1 of gate G1 will be high, causing the output of OR gate G2 to be high, in turn applying a reset pulse to all three flip-flops F1, F2, and F3. Because of the presence of the START pulse at set input S of flip-flop F1, the UP condition is retained, but flip-flops F2 and F3 are both reset. As a result, an UP signal alone will be supplied to charge pump 18, which will in turn supply an UP signal to integrator 19. The integrator will supply an output to power driver 20 which will in turn cause motor 10 to rotate.

Instead of continuing with description of acceleration of the motor from its starting condition, the essence of the invention will be easier understood if we assume that the motor is already at operating speed. Each of the following conditions will be considered separately: motor 10 rotates at reference speed (FIG. 2); motor 10 rotates at a speed which is lower than the reference speed (FIG. 3); motor 10 rotates at a speed higher than the reference speed but less than twice the reference speed (FIG. 4A); motor 10 rotates at a speed higher than twice reference speed (FIG. 4B).

Figure 2:
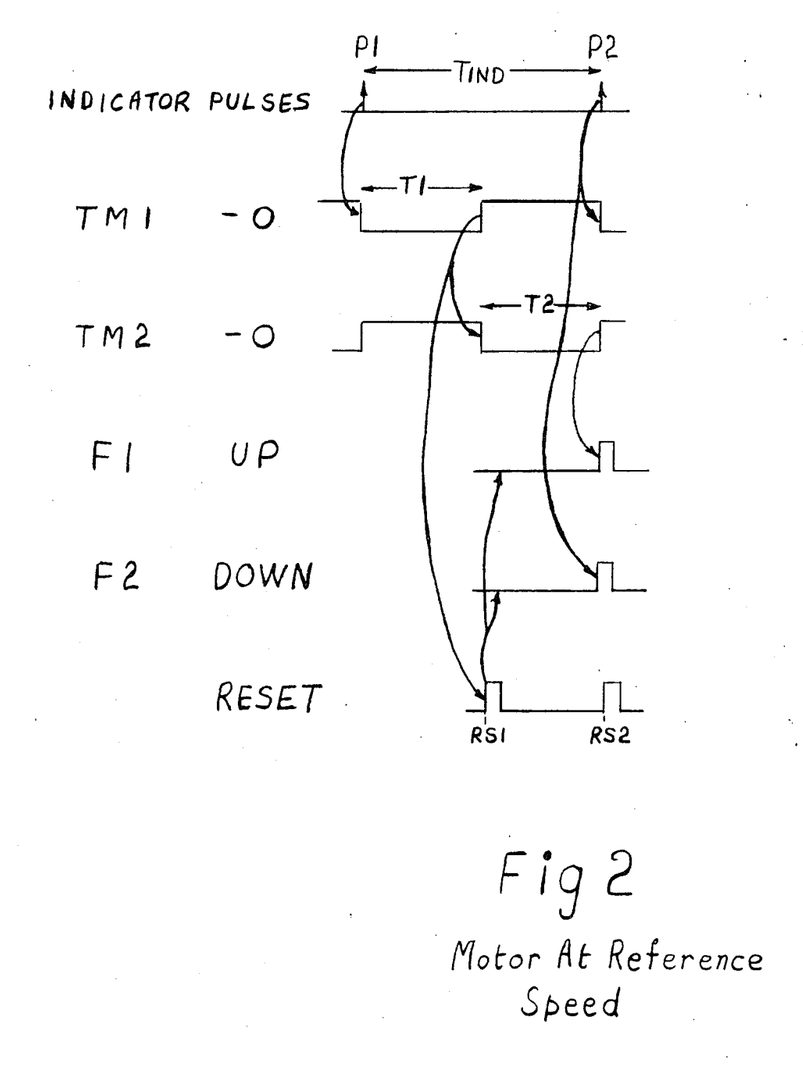
FIG. 2 is a timing diagram illustrating operation of the system of FIG. 1 when the motor is turning at a reference speed.

FIG. 2: OPERATION OF THE SYSTEM OF FIG. 1 AT REFERENCE SPEED OF MOTOR

This is an ideal case. As shown in FIG. 2, when the motor is at reference speed, the period T(IND) between indicator pulses P1 and P2 is exactly equal to a reference value generated by the sum of time periods T1 and T2 of the pulses generated by timers TM1 and TM2. That is, the following condition exists:

$$T(IND) = T1 + T2.$$

An indicator pulse P1 from encoder 12 triggers timer TM1 to initiate timed interval T1.

At the end of period T1, the negative output 0 of timer TM1 triggers timer TM2 and flip-flop F3. The output of flip-flop F3 resets flip-flops F1, F2, and F3 via gate G2. This action prepares flip-flops F1 and F2 for period comparison between the next indicator pulse signal (P2) and termination of period T2 of the negative output 0 of TM2.

In the case under consideration, signal P2 arrives at the clock input of flip-flop F2 in synchronism with the trailing edge of the output signal of timer TM2 at the clock input of F1. As a result, both flip-flops are set at the same time and then are reset via gates G1 and G2. The duration of UP and DOWN signals is the same and depends on the propagation delay of G1 and G2 and the reset times of flip-flops F1 and F2.

As a result, the UP and DOWN signals cancel each other, so that the INPUT and OUTPUT voltages of integrator 19 are not changed, whereby rotation speed is left unchanged.

Figure 3:
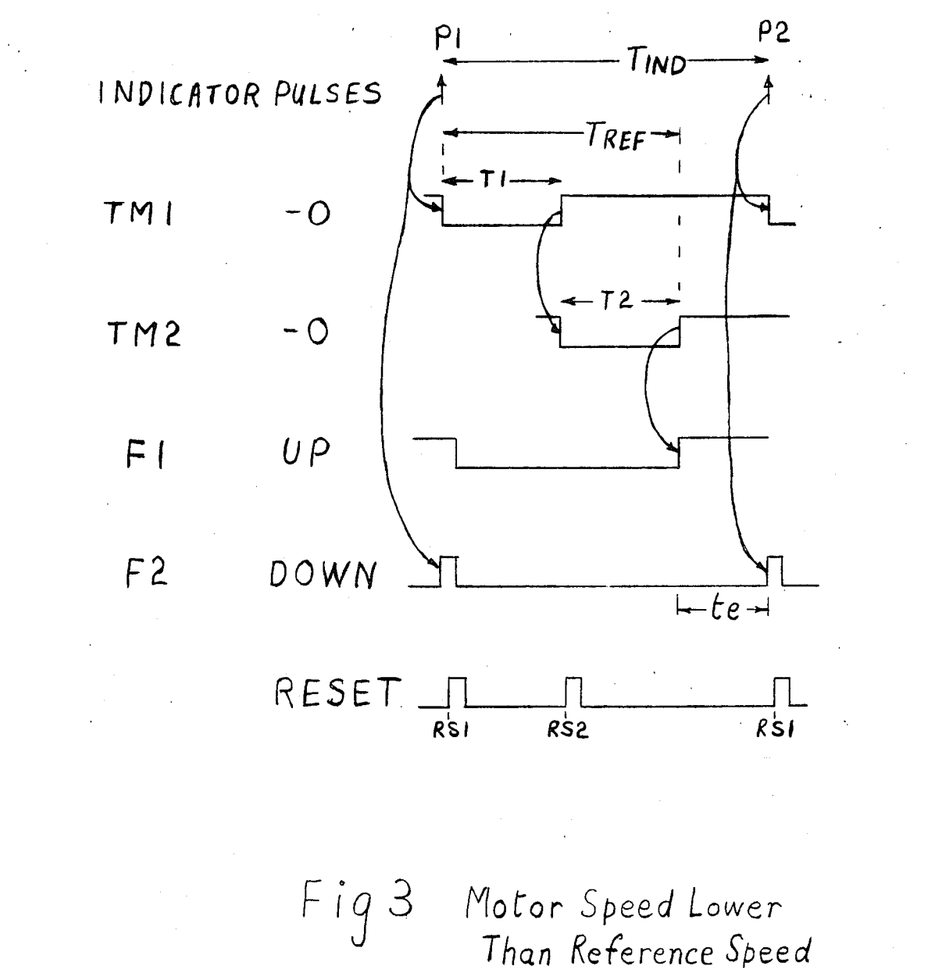
FIG. 3 is a timing diagram illustrating operation of the system of FIG. 1 when the motor's speed is lower than the reference speed.

FIG. 3: OPERATION OF THE SYSTEM OF FIG. 1 AT MOTOR SPEED LOWER THAN REFERENCE SPEED

As shown in FIG. 3, when the motor is at a speed lower than reference speed, the trailing edge of the negative output 0 (not shown in the drawings) of timer TM2 sets flip-flop F1 in an UP condition. Next, indicator pulse P2 arrives after a period error t(e) equal to the difference between reference and indicator pulse periods. Pulse P2 triggers flip-flop F2, setting comparator 16 in the DOWN state. As has been described earlier, when UP and DOWN exist together, then via AND gate G1 and OR gate G2, flip-flops F1 and F2 receive a reset pulse. This will cause both UP and DOWN flip-flops F1 and F2 to be reset via gates G1 and G2. As shown in FIG. 3, the difference in lengths of the UP and DOWN signals of F1 and F2 is equal to the error time t(e). Because the width of the UP signal exceeds that of the DOWN signal, the voltage on integrator 19 will increase in proportion to the period error, thereby causing motor 10 to accelerate.

Figure 4A:
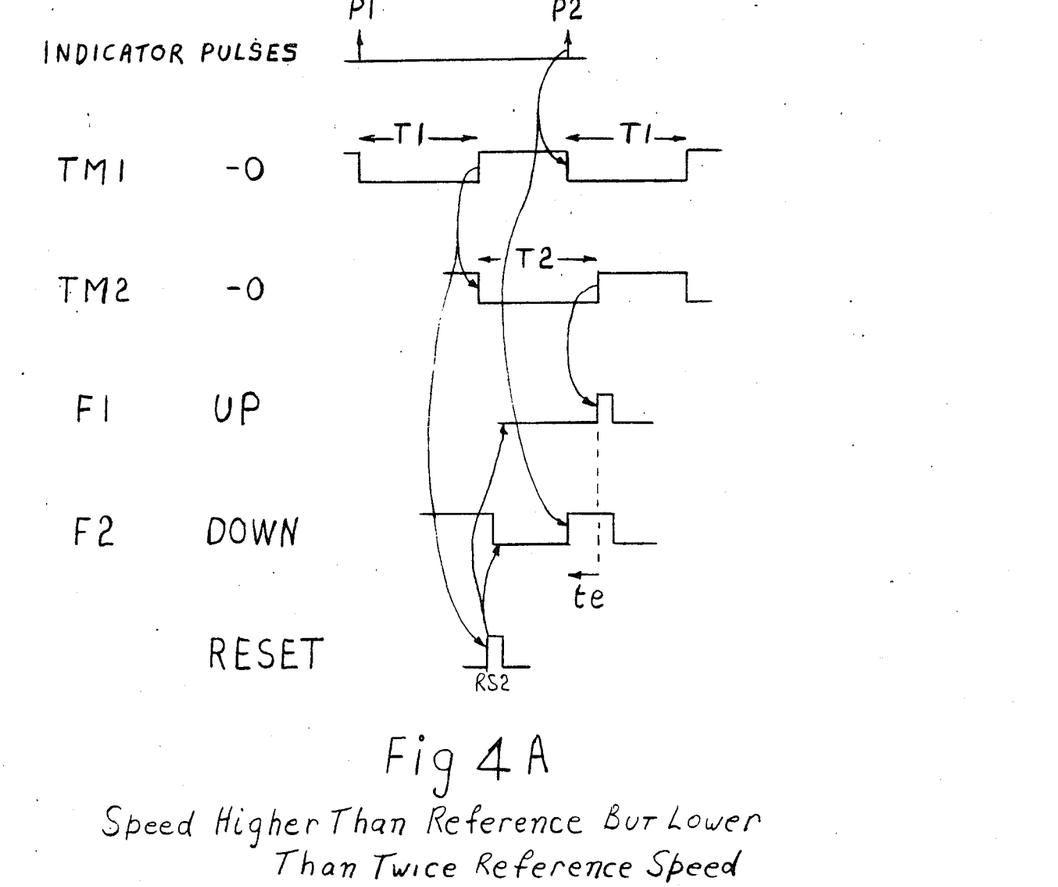
FIG. 4A is a timing diagram illustrating operation of the system of FIG. 1 when the motor's speed is higher than reference speed but lower than twice reference speed.
Figure 4B:
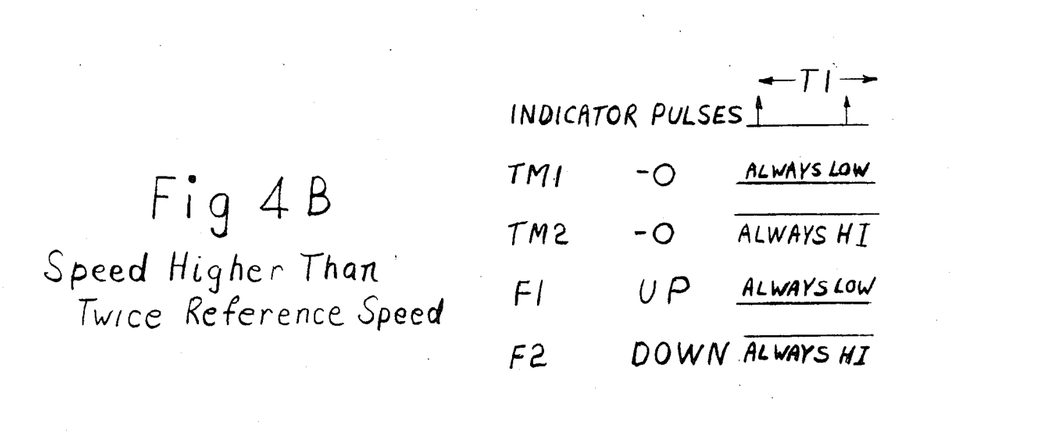
FIG. 4B is a timing diagram illustrating operation of the system of FIG. 1 when the motor's speed is higher than twice reference speed.

FIG. 4A: OPERATION OF SYSTEM OF FIG. 1 AT MOTOR SPEED HIGHER THAN REFERENCE SPEED BUT LESS THAN TWICE REFERENCE SPEED

As shown in FIG. 4A, when the motor is at a speed higher than reference speed but less than twice reference speed, at the end of period T1, negative output 0 of timer TM1 triggers timer TM2 and flip-flop F3 (FIG. 1). The output of flip-flop F3 resets flip-flops F1, F2, and F3 via gate G2. This action prepares flip-flops F1 and F2 for comparison of the period between the next indicator pulse signal (P2) and the trailing edge of the output signal of TM2. In the case under consideration, signal P2 arrives at the clock input of flip-flop F2 before the trailing edge of the negative output signal 0 of timer TM2 at the clock input of F1. Therefore, the DOWN signal occurs first and is longer than the UP signal by the period error t(e). As a result, the motor's speed will decelerate.

FIG. 4B: OPERATION OF SYSTEM OF FIG. 1 AT MOTOR SPEED HIGHER THAN TWICE REFERENCE SPEED

As shown in FIG. 4B, when the motor is at a speed higher than twice reference speed, indicator pulses have a period T(IND) which is less than T1. Therefore, timer TM1 is restarted by indicator pulses before terminal count can occur, so the negative output 0 of timer TM1 is always low. As a result, timer TM2 is never triggered and negative output 0 of the timer TM2 is always high. Also, flip-flop F3 is never triggered, so the usual RS2 reset does not occur. Then the only triggering input at period comparator 16 is a string of indicator pulses applied to the clock input of flip-flop F2. If an UP condition had initially been present at flip-flop F1, it would be reset via gates G1 and G2 by a triggered DOWN condition at F2. Therefore, only the DOWN condition is retained, and this decelerates motor 10. When speed has fallen to less than twice the reference speed, the condition of the earlier described Mode I occurs.

Figure 5:
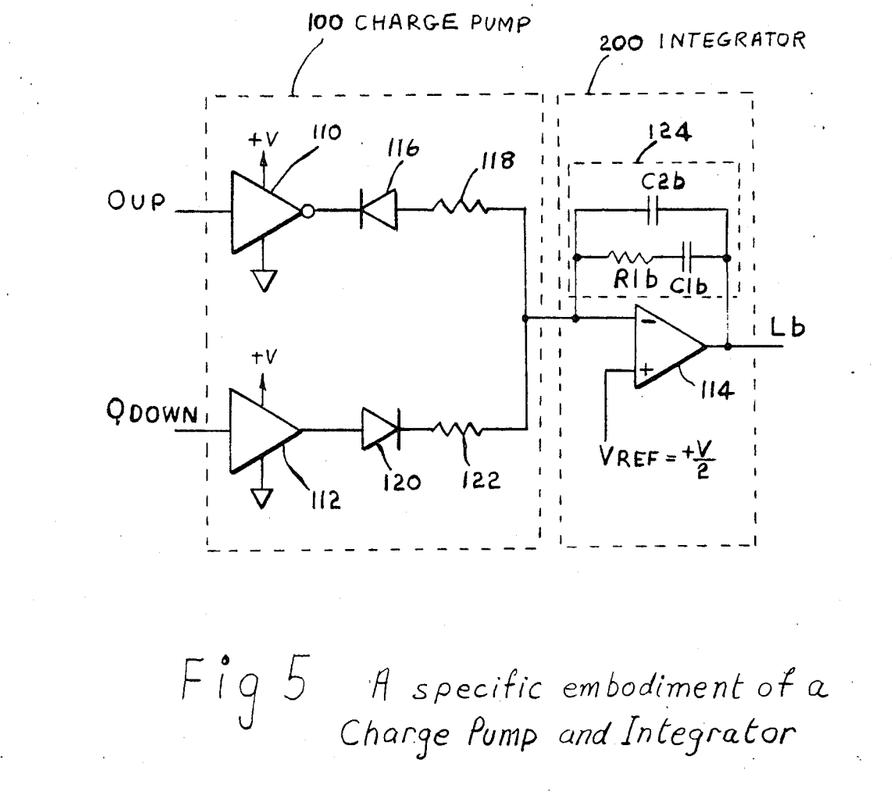
FIG. 5 is a diagram illustrating a specific embodiment of a charge pump and integrator of the circuit of FIG. 1.

FIG. 5: CHARGE PUMP WITH INTEGRATOR

A specific embodiment of a charge pump 100 with an integrator 200 is shown in FIG. 5. Charge pump 100 comprises an inverter 110 and a non-inverter (buffer or isolator) 112. The outputs of elements 110 and 112 have two levels, i.e., zero and +V. The inputs of gates 110 and 112 are connected to respective outputs O(UP) and O(DOWN) of period comparator 16 (FIG. 1). The output of gate 110 is coupled to the input of integrator 200 via a series circuit consisting of a diode 116 and a resistor 118, while the output of gate 112 is coupled to the same input via diode 120 and resistor 122. Diodes 116 and 120 are oppositely polarized.

Integrator 200 consists of an operational amplifier which comprises a high-gain amplifier 114 which has a positive input terminal biased to +V/2. As is well known in the art, the other (i.e., negative) input of amplifier 114 has its voltage approximately equal to that of the positive input, i.e., in this case +V/2. Output L of amplifier 114 is connected to its negative input by means of a capacitive feedback network 124, which is similar to that of integrator 19. Corresponding elements are designated by the same reference numerals but with addition of suffix "b".

Charge pump 100 operates with integrator 200 as follows: When the O(UP) signal is low, the output of inverting gate 110 is +V, and neglecting voltage drop across diode 116, a voltage of +V/2 is impressed across resistor 118. This produces a proportional current. On the other hand, when output of gate 110 is at high level, diode 116 is back biased, so no current flows.

Therefore, when the O(UP) signal is pulsed high, a charge is pumped out of the negative terminal of integrator 200 in proportion to the above-mentioned current and the pulse time. Gate 112, in conjunction with diode 120 and resistor 122 operates in a similar manner except that current and charge slow in the reverse direction, i.e., into the negative terminal of integrator 200. Thus, it can be understood that depending on UP or DOWN conditions on the inputs to charge pump 100, the charge flows either from or to integrator 200. Integrator 200 integrates the charge in a manner similar to that which has been described with reference to integrator 19. However, the integrator voltage is developed across integrator network 124 to produce an output at L(b). This output is positive for generally UP condition, and negative for generally DOWN condition, as for the earlier described charge pump and integrator (FIG. 1).

Figure 6:
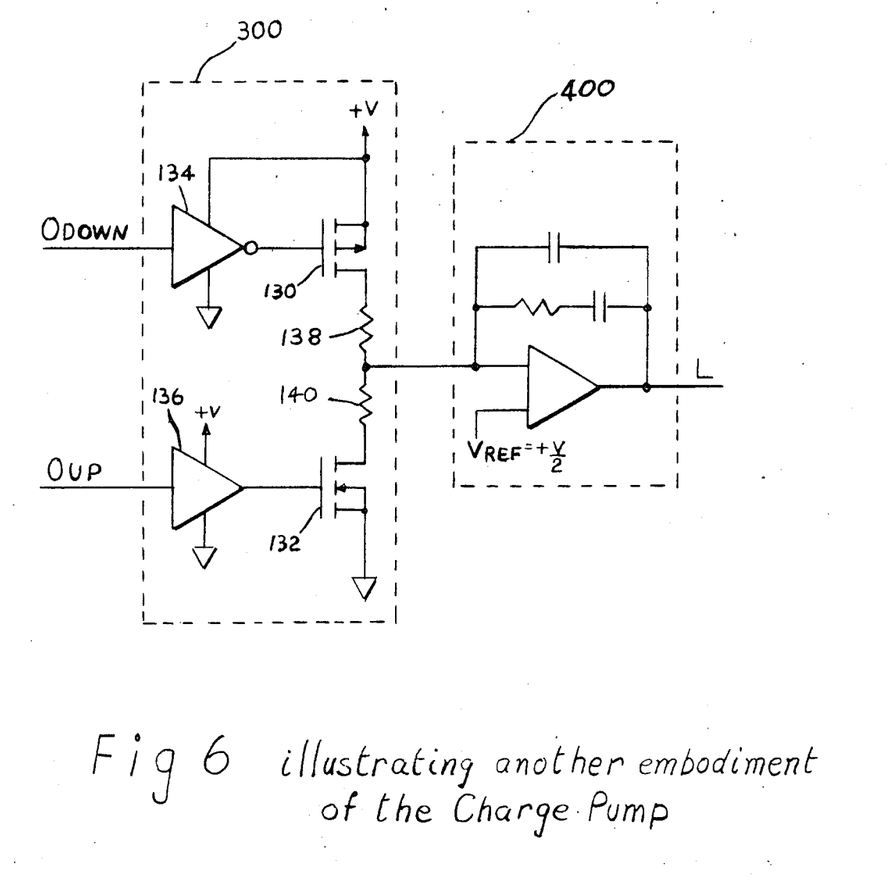
FIG. 6 is a schematic circuit diagram illustrating another embodiment of the charge pump.

FIG. 6: ANOTHER EMBODIMENT OF CHARGE PUMP AND INTEGRATOR

Another embodiment of a unit composed of a charge pump 300 with an integrator 400 is shown in FIG. 6. This embomodification differs from the previous one in that MOS transistors 130 and 132 are used instead of diodes 116 and 120 of FIG. 5. In addition, the input O(DOWN) is applied to an inverting gate 134, whereas the input O(UP) is applied to non-inverting gate 136. This is done to provide consistency with the earlier circuits where output L is positive going for UP commands. An advantage of this circuit as compared to one using diodes (FIG. 5) is that the MOS transistors connect resistors 138 and 140 to +V or to ground, respectively, without the voltage drop inherent in diodes.

Figure 7:
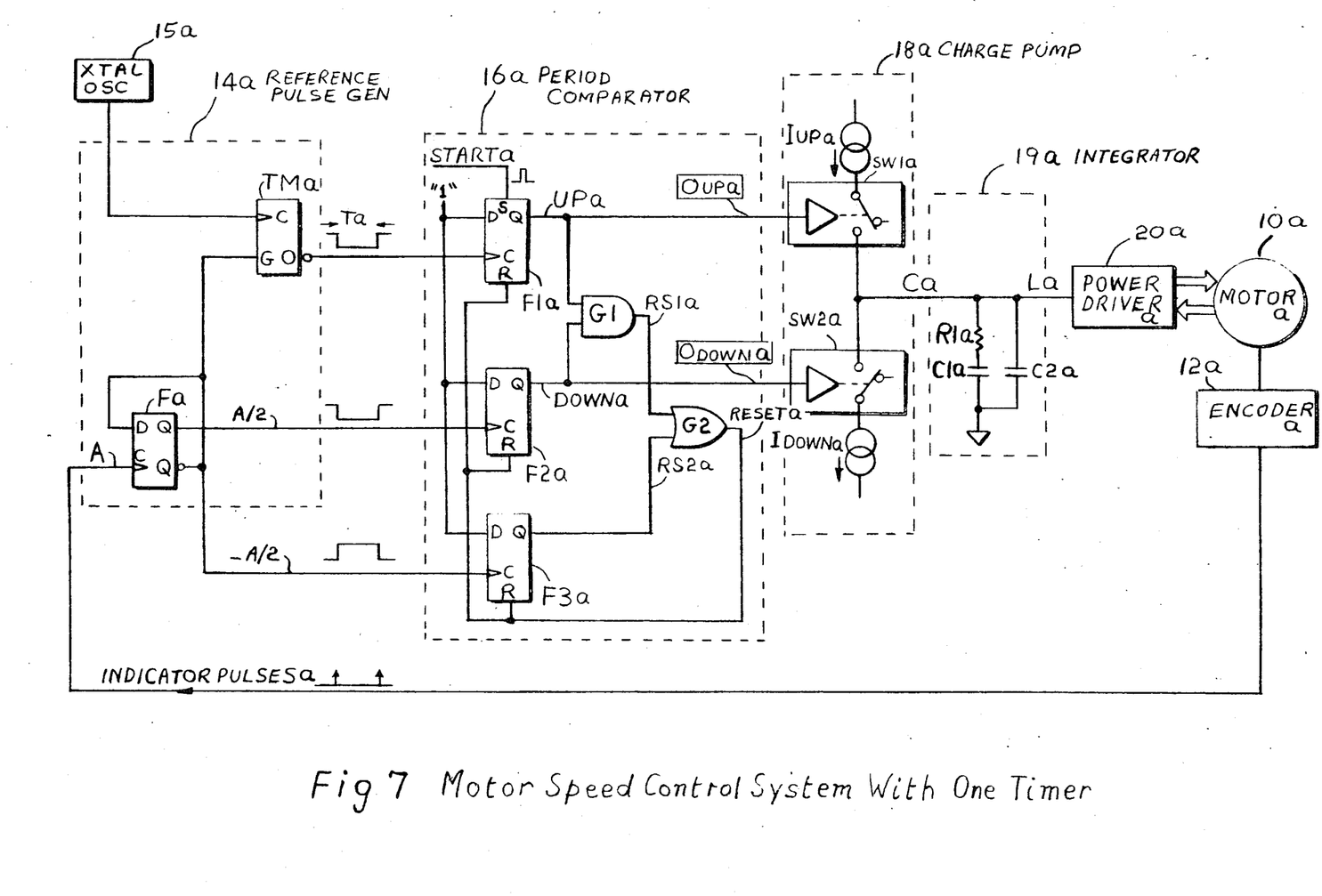
FIG. 7 is a diagram of the motor speed control circuit using a period comparator with only one counter.
Figure 8A:
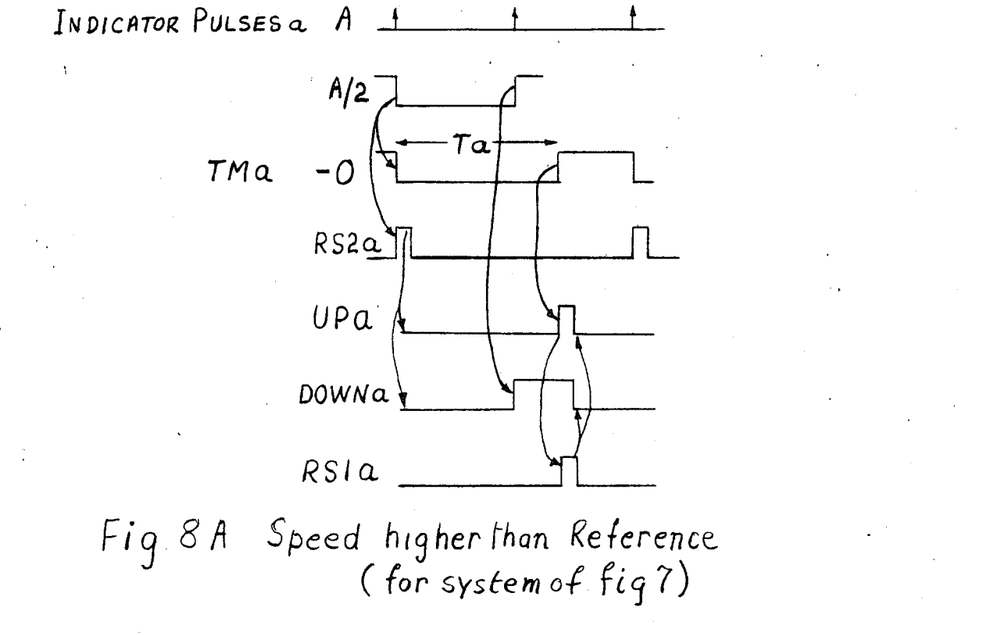
FIG. 8A is a timing diagram illustrating operation of the system of FIG. 7 in the case where the speed of the motor is higher than reference speed.
Figure 8B:
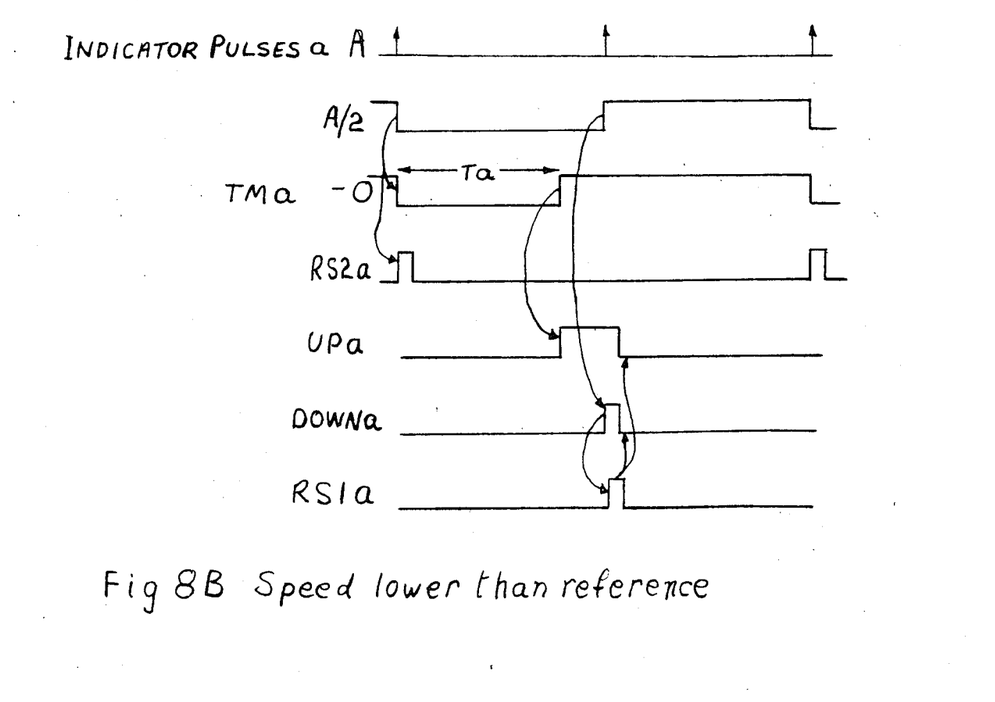
FIG. 8B is a timing diagram similar to that of FIG. 8A, except that the motor's speed is lower than reference speed.

FIGS. 7, 8A, AND 8B: CONTROL CIRCUIT USING PERIOD GENERATOR WITH SINGLE TIMER (FIGS. 7, 8A AND 8B)

The embodiments described above were based on a period generator using two counters. However, the invention also can be realized by means of a control circuit having only one counter which also works as a timer. The embodiment with one timer is illustrated in FIG. 7. FIG. 8A shows a timing diagram illustrating operation of the system of FIG. 7 at a speed which is higher than reference speed and FIG. 8B shows a timing diagram of the same in case where the motor speed is lower than the reference speed.

Since the system of this embodiment is generally identical to that described above, only different parts of it will be described. Where parts in the second embodiment are similar to those of FIG. 1, they are designated by the same reference numerals with addition of suffix "a".

The motor speed control system shown in FIG. 7 consists of a motor 10a, an electromechanical encoder 12a, and a pulse generator circuit 14a which is formed using one timer TMa. The system also has a flip-flop Fa which has an input C, an input D, an output Q and a negative output Q. Encoder 12a is connected to input C of flip-flop Fa. The negative output Q of flip-flop Fa is connected to input D of flip-flop Fa and to input G of timer TMa. Clock C of counter TMa is attached to a crystal-controlled oscillator XTALa OSC.

Similar to the circuit of the first embodiment, the system has three flip-flops (F1a, F2a, and F3a with respective inputs and outputs) and logic elements (an AND gate G1a and an OR gate G2a with respective inputs and outputs).

A negative output 0 of timer TMa is connected to input C of flip-flop F1a, an output Q of flip-flop Fa is connected to an input C of flip-flop F2a, and a negative output Q of flip-flop Fa is connected to an input C of flip-flop F3a.

OPERATION OF THE SYSTEM OF FIG. 7

Operation of the system of FIG. 7 is very similar to that described with regard to FIG. 1 and its respective timing diagrams for high and low speed. However, there is only one timer in the circuit. Therefore only every second indicator pulse results in a period comparison. Based on the previous detailed description, those skilled in the art can easily understand the principle and sequence of operations of the circuit of FIG. 7 by referring to the timing diagrams shown in FIGS. 8A and 8B for high and low speeds, respectively.

Since only every other indicator pulse results in a period sample, some decrease in the accuracy of speed control can result if there is significant second harmonic distortion in the indicator pulse signal. In addition, the sampling rate is halved.

CONCLUSION, RAMIFICATIONS AND SCOPE

Thus, in operation of the above-described system, when no correction to speed is required, no net charge is pumped, and the integrator "holds" the previous condition of motor drive operation. On the other hand, if motor speed is incorrect, the error condition is sampled through the control circuit and the speed is corrected by modifying the charge on the integrator. As compared to the control circuit of the aforementioned U.S. Pat. No. 4,516,060, the sample and hold mode of operation of the control circuit generally has a constant output at the integrator and therefore does not introduce any ripple on the motor current. In addition, the accuracy of control is improved since the control circuit compares indicator period T(IND), which is itself an integral submultiple of the motor's rotation period, to a reference period T1+T2, which is an integral multiple of the crystal-controlled clock period. Any difference between the compared indicator and reference periods causes charge to flow into the integrator circuit, thus modifying the motor's speed until T(IND)=T1+T2. This condition occurs irrespective of inaccuracies in components of the circuits used. Thus motor speed has substantially the same accuracy as that of the crystal clock. Although the present invention has been described and shown with reference to specific circuits and circuit components, those skilled in the art understand that many other modifications of the speed control circuit are possible. For example, the timers can be implemented as counters, one-shots (monostable multivibrators), or other parts suitable for that purpose. The system shows one or two timers but it can be implemented with more than two timers in conjunction with other circuits. Although in the description equal values are used for T1 and T2, this is not necessary. The assumption of equality is made for ease of description only. The system of the invention has been illustrated in application to control of a motor. This motor was shown as a brushless DC motor. It can be, however, any other kind of motor suitable for the purpose. It should be understood, also, that this system is equally applicable to voltage-controlled oscillators or pattern generators. Thus, the scope of the invention should be determined, not by the examples given, but by appended claims and their legal equivalents.

What is claimed is:

1. A motor speed control system comprising:
   a motor;
   encoding means connected to said motor for generating indicator pulses related to rotational speed of said motor;
   period generator means comprising at least one counter which is initiated by said encoder means and generates a reference pulse period;
   a period comparator connected to said encoder means and to said period generator means, said period comparator having means for comparing said reference period to a period of said indicator pulses of said encoder and for producing an output signal as a result of the comparison, said period comparator having resetting means which resets said period comparator in response to said output signal;
   digital-to-analog converter means having an input and an output, said period comparator being connected to said input of said converter means; and
   motor driver means responsive to the output signal of said converter means for controlling the speed of said motor, said driver means having an input and an output, said output of said driver means being connected to said motor.

2. A system according to claim 1 wherein said period generator comprises a first counter and a second counter with both counters having a clock input, a gate input, and outputs, clock generator means connected to said clock inputs of both said counters; the output of said first counter being connected to the gate input of said second counter.

3. The system of claim 2 wherein said means for comparing said reference period to a period of said indicator pulses of said encoder comprises a first flip-flop, a second flip-flop, and a third flip-flop, each of said flip-flops having a triggering input, a reset input, and an output, said output of said first counter being connected to the triggering input of said third flip-flop, said output of said second counter being connected to the triggering input of said first flip-flop, said encoding means being connected to said gate input of said first counter and to said triggering input of said second flip-flop.

4. A system according to claim 3 wherein said resetting means comprises an AND gate and an OR gate, each having two inputs and one output, said output of said first flip-flop being connected to one input of said AND gate and said output of said second flip-flop being connected to the second input of said AND gate, said output of said AND gate being connected to one input of said OR gate, the second input of said OR gate being connected to the output of said third flip-flop, the output of said OR gate being connected to reset inputs of all said flip-flops.

5. The system of claim 4 wherein said digital-analog converter means comprises charge pump means consisting of first and second switchable current sources having inputs and outputs wherein said input of said first switchable current source is connected to said output of said first flip-flop and said input of said second switchable current source is connected to said output of said second flip-flop, the outputs of said switchable current sources being connected to each other and forming a common output from said charge pump means; an integrator means having an input and output; and a power driver means having input and output, wherein said input of said integrator means being connected to said output of said charge pump means, said output of said integrator means being connected to said input of said power driver, said output of said power driver being connected to said motor.

6. A system of claim 1 wherein said counters are timers.

7. A system of claim 6 wherein said timers are monostable multivibrators.

8. A motor speed control system comprising:
a motor;
encoding means connected to said motor for generating a succession of indicator pulses related to the speed of said motor;
timer means comprising a counter having clock, gate inputs and an output, clock generator means connected to said clock input of said counter;
a first flip-flop, a second flip-flop, and a third flip-flop, each of said flip-flops having a triggering input, a reset input, and an output, an AND gate element and an OR gate each having two inputs and one output, said output of said counter being connected to said clock input of said first flip-flop, said output of said first flip-flop being connected to a first input of said AND gate, said output of said second flip-flop being connected to a second input of said AND gate, said output of said AND gate being connected to a first input of said OR gate, said output of said third flip-flop being connected to a second input of said OR gate, said output of said OR gate being connected to said reset inputs of said first, second and third flip-flops, a fourth flip-flop having a triggering input, a data input, a non-inverted output and an inverted output, said encoder means being connected to said triggering input of said fourth flip-flop, said inverted output of said fourth flip-flop being connected to said data input, to said gate input of said counter, and to said triggering input of said third flip-flop, said non-inverted output of said fourth flip-flop being connected to said triggering input of said second flip-flop;
charge pump means consisting of first and second switchable current sources having inputs and outputs, said input of said first switchable current source being connected to said output of said first flip-flop and said input of said second switchable current source being connected to said output of said second flip-flop, the outputs of said switchable current sources being connected to each other and forming a common output from said charge pump means;
integrator means having an input and an output; and a power driver means having input and output, said input of said integrator means being connected to said output of said charge pump means, said output of said integrator means being connected to said input of said power driver, said output of said power driver being connected to said motor.

9. A system of claim 8 wherein said counter is a timer.

10. A system of claim 9 wherein said timer is a monostable multivibrator.

11. A motor speed control system comprising:
a motor;
encoding means connected to said motor for generating a succession of indicator pulses related to the speed of said motor;
timer means consisting of a first counter and a second counter, each counter having a clock input, a gate input, and an output, a clock generator means connected to said clock inputs of both said counters, the output of said first counter being connected to the gate input of said second counter;
a period comparator comprising a first flip-flop, a second flip-flop, and a third flip-flop, each of said flip-flops having a triggering input, a reset input, and an output, said output of said first counter being connected to the triggering input of said third flip-flop, said output of said second counter being connected to the triggering input of said first flip-flop, said encoding means being connected to said gate input of said first timer and to said triggering input of said second flip-flop, an AND gate and an OR gate, each having two inputs and one output, said output of said first flip-flop being connected to one input of said AND gate and said output of said second flip-flop being connected to the second input of said AND gate, said output of said AND gate being connected to one input of said OR gate, the second input of said OR gate being connected to the output of said third flip-flop, the output of said OR gate being connected to the reset inputs of all said flip-flops;
charge pump means consisting of first and second switchable current sources having inputs and outputs, said input of said first switchable current source being connected to said output of the first flip-flop and said input of said second switchable current source being connected to said output of said second flip-flop, the outputs of said switchable current sources being connected to each other and forming a common output from said charge pump means;
integrator means having an input and an output; and a power driver means having an input and an output, said input of said integrator means being connected to said output of said charge pump means, said output of said integrator means being connected to said input of said power driver, said output of said power driver being connected to said motor.

12. A system of claim 11 wherein said counters are monostable multivibrators.

* * * * *